United States Patent
Yui et al.

(10) Patent No.: US 11,525,511 B2
(45) Date of Patent: Dec. 13, 2022

(54) FILM-INTEGRATED GASKET HAVING A GASKET SUPPORT WITH A RECESS FORMED THEREIN

(71) Applicant: NOK CORPORATION, Tokyo (JP)

(72) Inventors: Hajime Yui, Fujisawa (JP); Kenichi Oba, Fujisawa (JP)

(73) Assignee: NOK CORPORATION

(*) Notice: Subject to any disclaimer, the term of this patent is extended or adjusted under 35 U.S.C. 154(b) by 279 days.

(21) Appl. No.: 16/619,274

(22) PCT Filed: May 29, 2018

(86) PCT No.: PCT/JP2018/020564
§ 371 (c)(1),
(2) Date: Dec. 4, 2019

(87) PCT Pub. No.: WO2018/225584
PCT Pub. Date: Dec. 13, 2018

(65) Prior Publication Data
US 2020/0096109 A1    Mar. 26, 2020

(30) Foreign Application Priority Data
Jun. 6, 2017   (JP) ................ JP2017-111440

(51) Int. Cl.
F16J 15/08    (2006.01)
H01M 8/0276  (2016.01)
B29D 99/00    (2010.01)

(52) U.S. Cl.
CPC ...... *F16J 15/0818* (2013.01); *B29D 99/0053* (2013.01); *H01M 8/0276* (2013.01)

(58) Field of Classification Search
CPC ...... F16J 15/0818; F16J 15/104; F16J 15/127; B29D 99/0053; H01M 8/0276; Y02E 60/50
See application file for complete search history.

(56) References Cited

U.S. PATENT DOCUMENTS 6,814,359 B2 * 11/2004 Senda ................ H01M 8/0271
                                                    277/639
2004/0075224 A1 * 4/2004 Kuroki ............... H01M 8/0276
                                                    277/650
(Continued)

FOREIGN PATENT DOCUMENTS

CN    1476646 A    2/2004
CN   101432916 A   5/2009
(Continued)

OTHER PUBLICATIONS

Machine translation of JP 2002-228001A, Matsumoto Kenji, 2002 (Year: 2002).*
Machine translation of JP 4224668B2, Inoue, 2009 (Year: 2009).*

*Primary Examiner* — Kwang Han
(74) *Attorney, Agent, or Firm* — Harness, Dickey & Pierce, P.L.C.

(57) ABSTRACT

A film-integrated gasket is provided in which a gasket body is supported by a gasket support body formed of a resin film and a film thickness $t_2$ at a position where the gasket body is supported is set to be smaller than a film thickness $t_1$ at an adjacent position thereto so as to satisfy a demand for low reaction force by reducing the compression ratio in the thickness directional in mounting. The film-integrated gasket can be provided with a portion compressed in the thickness direction at the position where the gasket body is supported, so that the portion sets a thickness difference. The film-integrated gasket can alternatively be provided with a portion where a plurality of resin films is stacked at an adjacent position to the position where the gasket main body is supported, so that the portion sets a thickness difference.

9 Claims, 9 Drawing Sheets

(56) References Cited

U.S. PATENT DOCUMENTS

| | | |
|---|---|---|
| 2005/0098962 A1 | 5/2005 | Duclos et al. |
| 2009/0075143 A1 | 3/2009 | Kurano et al. |
| 2009/0286136 A1 | 11/2009 | Yamamoto et al. |

FOREIGN PATENT DOCUMENTS

| | | | |
|---|---|---|---|
| JP | 2002-228001 * | 8/2002 | ............. Y02E 60/50 |
| JP | 2002-228001 A | 8/2002 | |
| JP | 2003-056704 A | 2/2003 | |
| JP | 2005-003181 A | 1/2005 | |
| JP | 2005-108526 A | 4/2005 | |
| JP | 2006-024386 A | 1/2006 | |
| JP | 2007-294248 A | 11/2007 | |
| JP | 4224668 B2 * | 2/2009 | ............. H01M 8/02 |
| JP | 5308854 B2 | 10/2013 | |

* cited by examiner

FIG. 5
(A)
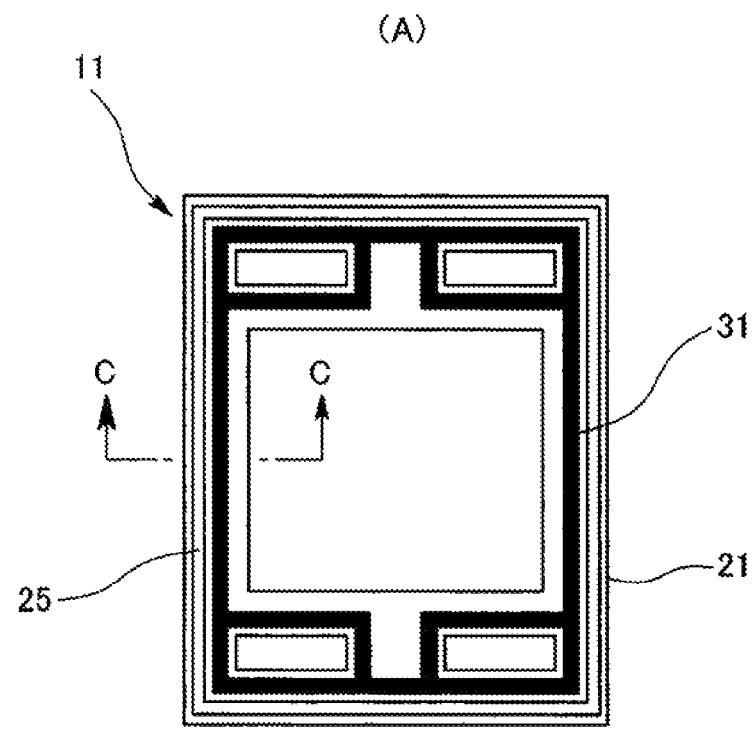
(B)
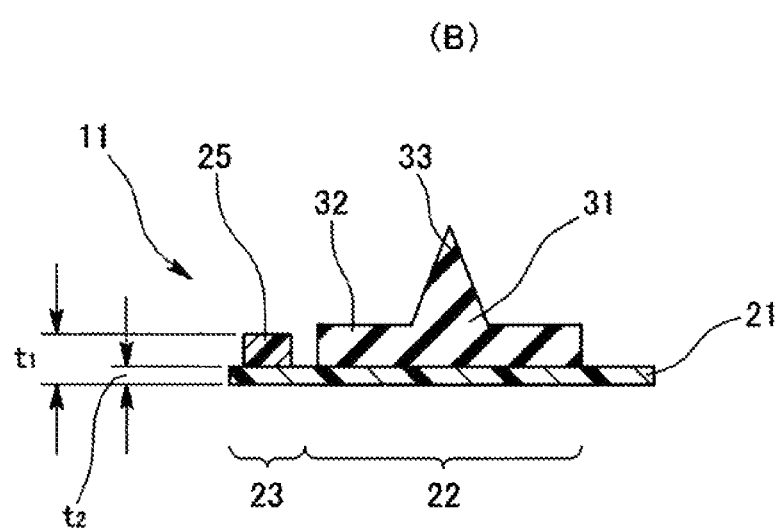

FIG. 7
(A)
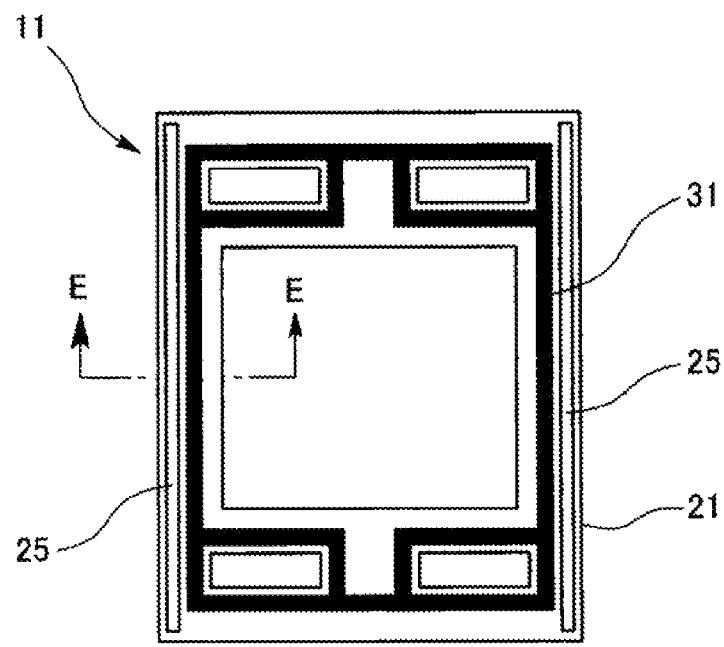
(B)
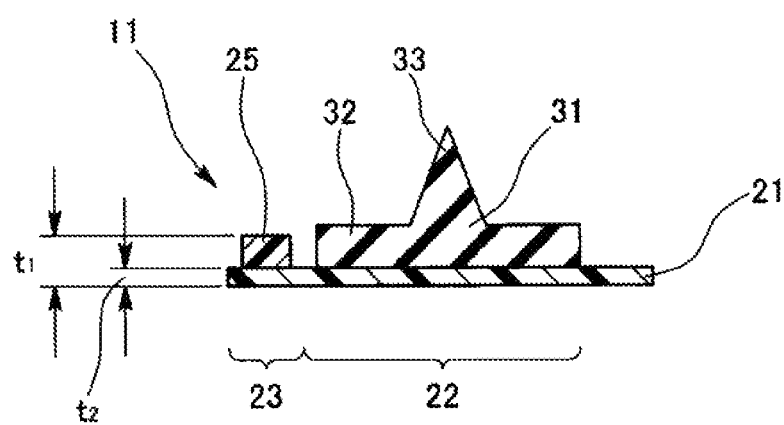

*FIG. 8*
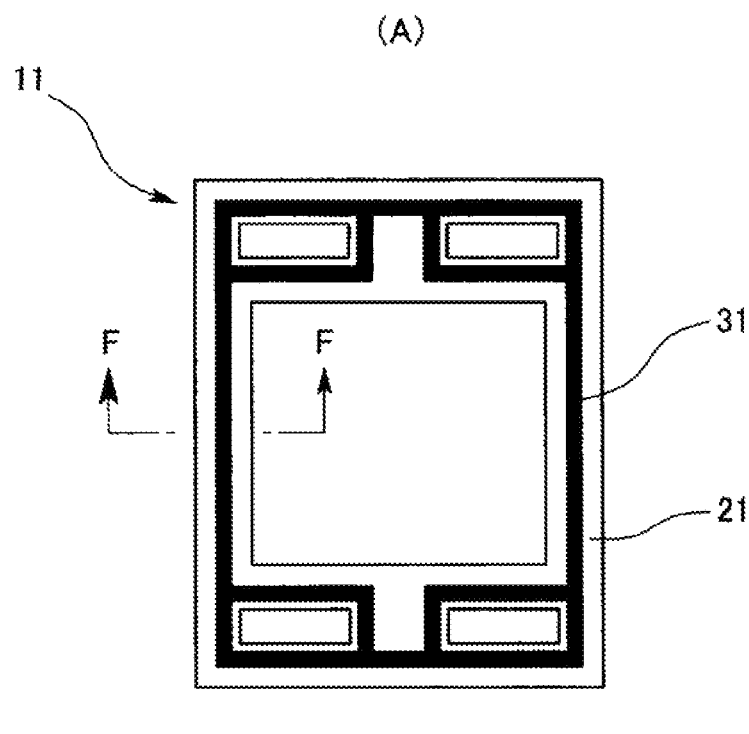
(A)
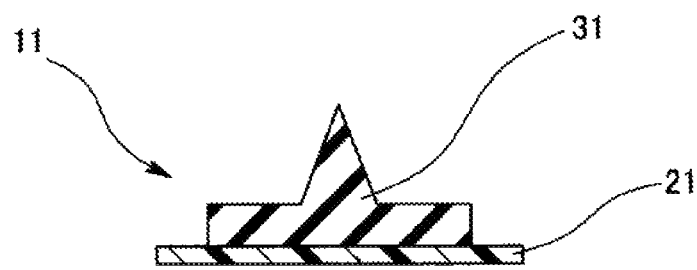
(B)

FIG. 9
(A)
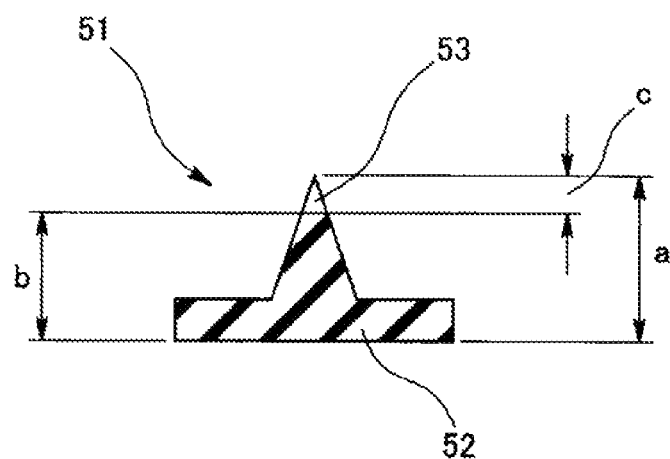
(B)
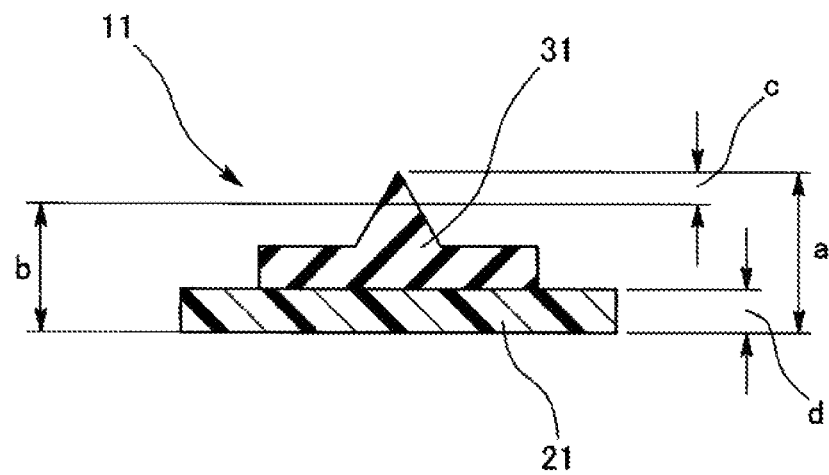

FILM-INTEGRATED GASKET HAVING A GASKET SUPPORT WITH A RECESS FORMED THEREIN

CROSS REFERENCE TO RELATED APPLICATIONS

This application is a U.S. National Phase application of International Application No. PCT/JP2018/020564, filed on May 29, 2018 and published in Japanese as WO2018/225584 on Dec. 13, 2018 and claims priority to Japanese Patent Application No. 2017-111440, filed on Jun. 6, 2017. The entire disclosures of the above applications are expressly incorporated by reference herein.

BACKGROUND

Technical Field

The disclosure relates to a film-integrated gasket relating to a sealing technique. The film-integrated gasket of the disclosure is used as a fuel cell gasket or used as the other common gaskets.

Related Art

Conventionally, as a fuel cell gasket, a film-integrated gasket 11 is known which has a resin film-containing gasket support 21 and a gasket body 31 provided on the plane of the gasket support 21 and supported by the gasket support 21 as illustrated in FIG. 8A and FIG. 8B.

In the film-integrated gasket 11, the gasket body 31 is supported and reinforced by the gasket support 21, and therefore has great effect on a reduction in assembling number of processes or the like from the viewpoint of an improvement of a handling property as compared with a conventional rubber-only gasket 51 containing only a gasket body illustrated in FIG. 9A.

However, the film-integrated gasket 11 has a large rubber compression ratio in the thickness direction in mounting of an actual device as compared with the rubber-only gasket 51 due to the configuration. Therefore, rubber reaction force increases, and thus the film-integrated gasket 11 is difficult to be used for a mounting portion requiring low reaction force. In recent years, the stack configuration becomes complicated in the fuel cell, and therefore, as a demand for a gasket, a gasket satisfying low reaction force while securing a handling property has been demanded.

The compression ratio is indicated as follows.

In the rubber-only gasket 51, when the thickness of the entire gasket 51 containing a combination of a gasket base 52 and a seal lip 53 is defined as "a", the thickness of a mounting portion (mounting clearance width) is defined as "b" (a>b), and a difference therebetween, i.e., compression amount, is defined as "c" as illustrated in FIG. 9A, the compression is given by $$\text{Compression ratio} = c/a \times 100 (\%) \qquad \text{Expression (1)}.$$

Meanwhile, in the film-integrated gasket 11, a thickness d of the resin film-containing gasket support 21 which is hardly compressed even when mounted is subtracted from a thickness a of the entire gasket 11 as illustrated in FIG. 9B, and therefore the compression ratio is given by $$\text{Compression ratio} = c/(a-d) \times 100 (\%) \qquad \text{Expression (2)}.$$

Accordingly, the compression ratio of the film-integrated gasket 11 given by Expression (2) is larger than that of the rubber-only gasket 51 given by Expression (1), so that the reaction force of the film-integrated gasket 11 is higher than that of the rubber-only gasket 51 in some cases.

It is an object to reduce the compression ratio in the thickness direction in mounting even in a film-integrated gasket.

SUMMARY

A film-integrated gasket of the disclosure is provided with a gasket body and a gasket support formed of a resin film, supporting the gasket body, and having a film thickness at a position where the gasket body is supported smaller than the film thickness at an adjacent position thereto.

Effect

The disclosure can reduce the compression ratio in the thickness direction in mounting even in a film-integrated gasket.

BRIEF DESCRIPTION OF THE DRAWINGS

FIGS. 5A and 5B are views illustrating a film-integrated gasket of a second embodiment, in which FIG. 5A is a plan view thereof and FIG. 5B is a cross-sectional view of a principal portion thereof and an enlarged cross sectional view along the C-C line in FIG. 5A.

FIGS. 6A and 6B are views illustrating a film-integrated gasket of a third embodiment, in which FIG. 6A is a plan view thereof and FIG. 6B is a cross-sectional view of a principal portion thereof and an enlarged cross sectional view along the D-D line in FIG. 6A.

FIGS. 7A and B are views illustrating a film-integrated gasket of a fourth embodiment, in which FIG. 7A is a plan view thereof and FIG. 7B is a cross-sectional view of a principal portion thereof and an enlarged cross sectional view along the E-E line in FIG. 7A.

FIGS. 8A and 8B are views illustrating a film-integrated gasket of a prior art, in which FIG. 8A is a plan view thereof and FIG. 8B is a cross-sectional view of a principal portion thereof and an enlarged cross sectional view along the F-F line in FIG. 8A.

FIG. 9A is a cross-sectional view of a principal portion of a rubber-only gasket according to a prior art.

FIG. 9B is a cross-sectional view of a principal portion of the film-integrated gasket according to the prior art.

DETAILED DESCRIPTION

First Embodiment

Figure 1:
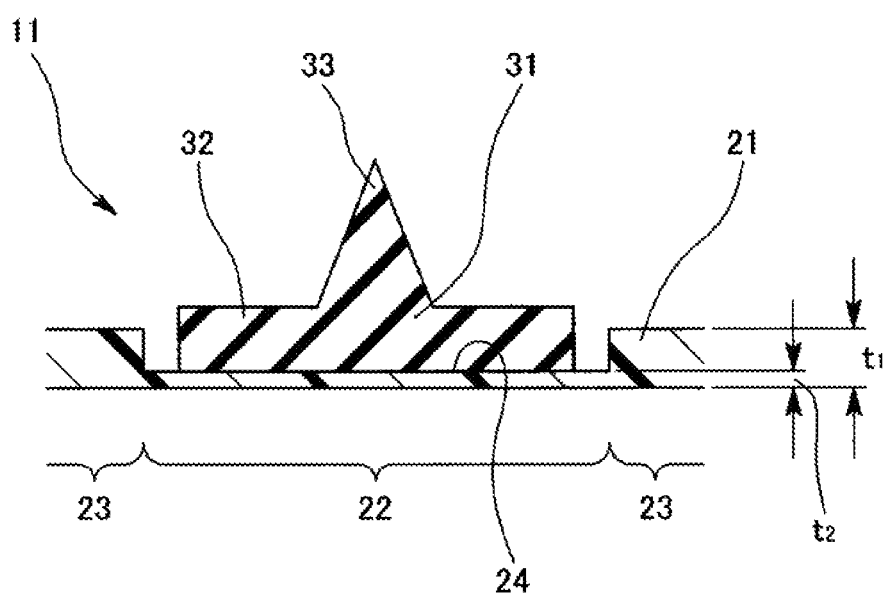
FIG. 1 is a cross-sectional view of a principal portion of a film-integrated gasket of a first embodiment.

As illustrated in FIG. 1, a film-integrated gasket 11 of this embodiment is a film-integrated gasket having a resin film-containing plate-like gasket support 21 and a gasket body 31 containing a rubber-like elastic body provided on the plane of the gasket support 21 and supported by the gasket support 21. In the film-integrated gasket 11, a film thickness $t_2$ at a position where the gasket body 31 is supported (hereinafter also referred to as "gasket support position") 22 in the resin film-containing gasket support 21 is formed to be smaller than a film thickness $t_1$ at adjacent positions 23 thereto ($t_2 < t_1$).

In the resin film-containing gasket support 21, only the gasket support position 22 is compressed in the thickness direction and the adjacent positions 23 are not compressed. More specifically, a portion compressed in the thickness direction is provided at the position where the gasket body 31 is supported. The portion sets the film thickness $t_2$ at the gasket support position 22 to be smaller than the film thickness $t_1$ at the adjacent positions 23 thereto ($t_2 < t_1$).

The adjacent positions 23 are both a position on the outer periphery of the gasket support position 22 and a position on the inner periphery thereof.

As the standard of the film thickness, the film thickness $t_1$ at the adjacent positions 23 is set to be equivalent to a conventional thickness (for example, 0.2 mm or more) which is a value sufficient to support the gasket body 31 and the film thickness $t_2$ at the gasket support position 22 is set to a thickness (for example, less than 0.1 mm) smaller than the thickness.

The compression of the portion compressed in the thickness direction is performed by a hot pressing method.

As materials of the resin film, general-purpose films, such as polypropylene, polyethylene terephthalate, polyethylene naphthalate, a polyimide type, an ester type, an amide type, and an imide type, are usable.

The gasket support position 22 is disposed along the gasket body 31 and the gasket body 31 is disposed along a seal line of the gasket 11, and therefore the gasket support position 22 is disposed along the seal line of the gasket 11.

Meanwhile, the gasket body 31 containing a rubber-like elastic body is formed into a shape in which a seal lip 33 having a triangular cross-section is combined with a plate-like gasket base 32.

Figure 2:
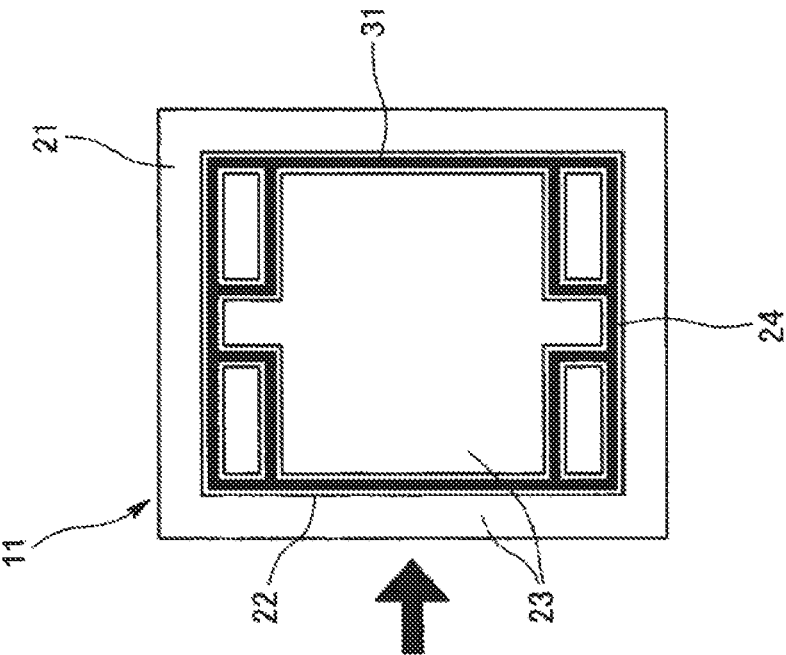
FIG. 2A, FIG. 2B, and FIG. 2C are explanatory views illustrating a manufacturing process of the film-integrated gasket.

As a procedure for manufacturing the gasket 11, the resin film-containing plate-like gasket support 21 having a fixed initial thickness $t_1$ over the entire surface is prepared as illustrated in FIG. 2A. Next, the gasket support 21 is applied to a pressing jig to compress only the gasket support position 22, so that the film thickness at the gasket support position 22 is reduced from $t_1$ to $t_2$ as illustrated in FIG. 2B. As a result, a groove-like recess 24 is formed at the gasket support position 22. Subsequently, by bonding the gasket body 31 separately manufactured onto the bottom surface of the recess 24 which is the gasket support position 22 and has a groove shape or using a die, the gasket body 31 is integrally formed as illustrated in FIG. 2C. For the bonding, an adhesive is used. However, when the gasket body 31 contains a self-adhesive rubber material, no adhesives are required.

Figure 3:
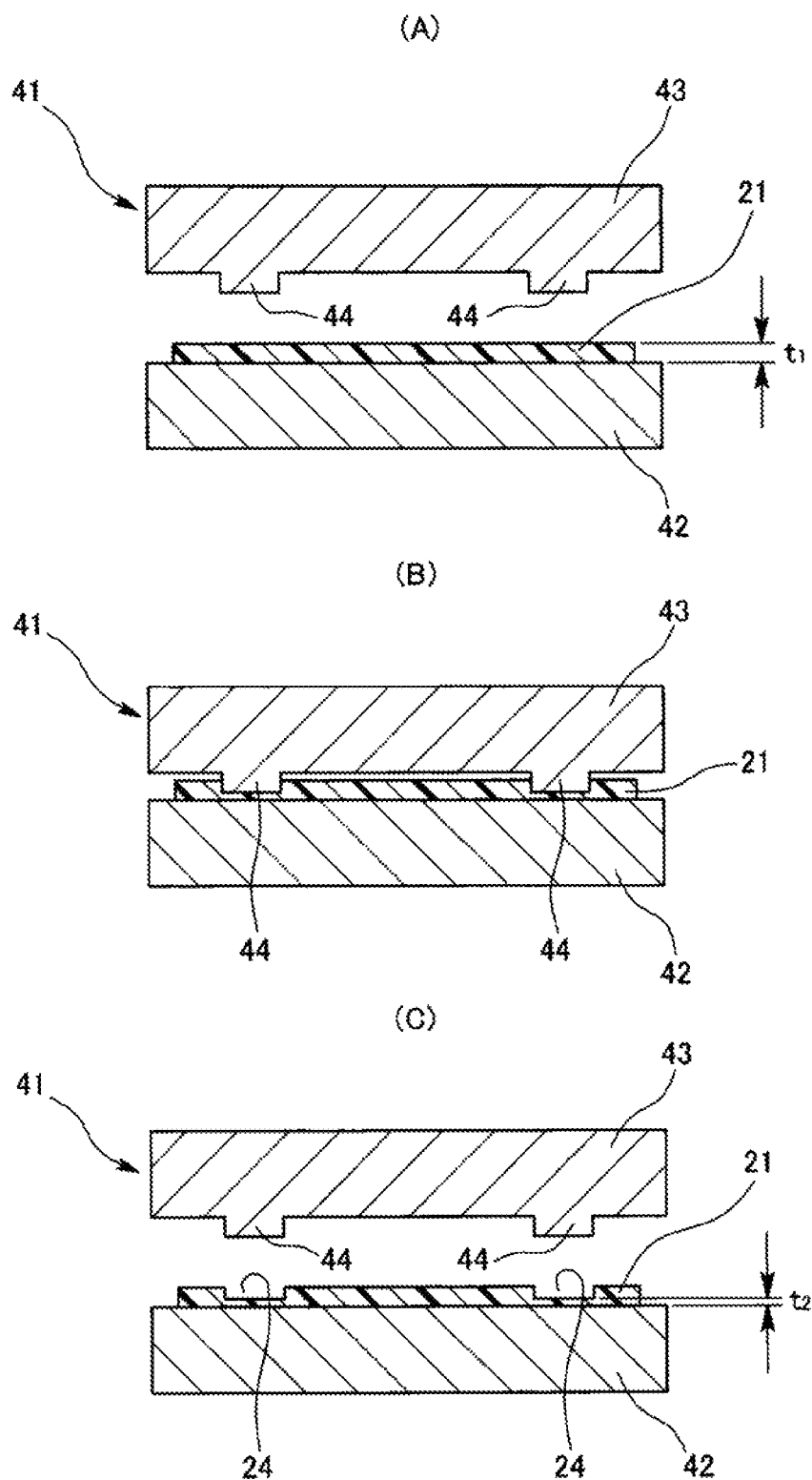
FIG. 3A, FIG. 3B, and FIG. 3C are explanatory views illustrating a manufacturing process of the film-integrated gasket.

As illustrated in FIG. 3A, FIG. 3B, and FIG. 3C, a pressing jig 41 is provided with a press die 43 working on a base 42. The press die 43 is provided with a pressing projection 44 and reversely forms the recess 24 by the projection 44.

According to the film-integrated gasket 11 having the above-described configuration, when the film thickness at the gasket support position 22 in the gasket support 21 remains $t_1$, the compression ratio is given by $$\text{Compression ratio} = c/(a - t_1) \times 100(\%) \quad \text{Expression (3)}.$$

On the other hand, the film thickness at the gasket support position 22 is reduced from $t_1$ to $t_2$, and the compression ratio is given by $$\text{Compression ratio: } c/(a - t_2) \times 100(\%) \quad \text{Expression (4)},$$

and therefore the compression ratio decreases due to $t_1 > t_2$. Accordingly, even in the case of the film-integrated gasket 11, the compression ratio in the thickness direction in mounting can be reduced as much as possible, and thus the film-integrated gasket 11 having a low reaction force characteristic can be provided.

Figure 4:
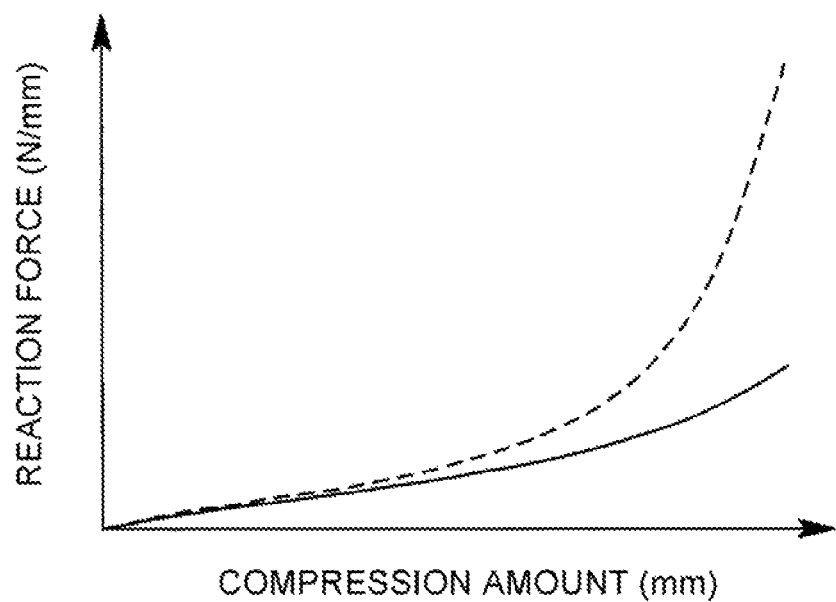
FIG. 4 is a graph chart illustrating comparison test results.

FIG. 4 illustrates comparison test results. As a sample, the film-integrated gasket 11 having a 400 mm×200 mm rectangular outer shape (planar shape) and having a thickness of 1 mm was produced. As the film, polypropylene (PP) having an initial thickness $t_1$ of 0.25 mm was used. In Comparative Example, the film was not compressed. In Example, the film was partially compressed, so that the film thickness at the gasket support position 22 was reduced by 0.15 mm to be set to 0.10 mm. As a material of the gasket body 31, L-VMQ was used.

It was able to be confirmed from the comparison test results that, in Example, the handling property remained good and moreover about 70% low reaction force was achieved when compared by FEM analysis as illustrated in a graph chart of FIG. 4. The graph chart of FIG. 4 illustrates Comparative Example by the dotted lines and illustrates Example by the solid line.

Second Embodiment

As illustrated in FIGS. 5A-5B, a film-integrated gasket 11 of this embodiment is a film-integrated gasket having a resin film-containing plate-like gasket support 21 and a gasket body 31 containing a rubber-like elastic body provided on the plane of the gasket support 21 and supported by the gasket support 21. In the film-integrated gasket 11, a film thickness $t_2$ at a position where the gasket body 31 is supported (hereinafter also referred to as "gasket support position") 22 in the resin film-containing gasket support 21 is formed to be smaller than a film thickness $t_1$ at an adjacent position 23 thereto ($t_2 < t_1$).

Herein, the resin film-containing gasket support 21 is formed into a one-sheet structure (monolayer structure) containing a thin resin film (first resin film) at the gasket support position 22 and formed into a multiple-sheet structure (laminated structure) in which a reinforcement body 25 containing a second resin film is stacked and bonded to the thin resin film (first resin film) at the adjacent position 23. More specifically, a portion where a plurality of resin films is stacked is provided at the adjacent position 23 to the position where the gasket body 31 is supported. The portion sets the film thickness $t_2$ at the gasket support position 22 to be smaller than the film thickness $t_1$ at the adjacent position 23 thereto ($t_2 < t_1$).

The adjacent position 23 is set to a position on the outer periphery of the gasket support position 22.

As the standard of the film thickness, the film thickness $t_1$ at the adjacent position 23 (laminated structure of the first and second resin films) is set to be equivalent to a conventional thickness (for example, 0.2 mm or more) which is a value sufficient to support the gasket body 31 and the film thickness $t_2$ at the gasket support position 22 (monolayer structure of the first resin film) is set to a thickness (for example, less than 0.1 mm) smaller than the thickness.

As materials of the films, general-purpose films, such as polypropylene, polyethylene terephthalate, polyethylene naphthalate, a polyimide type, an ester type, an amide type, and an imide type, are usable. For the first resin film and the second resin film, not only the same type of material but different types of materials can be selected.

The gasket support position 22 is disposed along the gasket body 31 and the gasket body 31 is disposed along a seal line of the gasket 11, and therefore the gasket support position 22 is disposed along the seal line of the gasket 11.

Meanwhile, the gasket body 31 containing a rubber-like elastic body is formed into a shape in which a seal lip 33 having a triangular cross-section is combined with the plate-like gasket base 32.

According to the film-integrated gasket 11 having the above-described configuration, when the film thickness at the gasket support position 22 in the gasket support 21 is $t_1$, the compression ratio is given by $$\text{Compression ratio} = c/(a-t_1) \times 100 (\%) \qquad \text{Expression (3)}.$$

On the other hand, the film thickness at the gasket support position 22 is reduced from $t_1$ to $t_2$, and the compression ratio is given by $$\text{Compression ratio: } c/(a-t_2) \times 100 (\%) \qquad \text{Expression (4)},$$

and therefore the compression ratio decreases due to $t_1 > t_2$. Accordingly, even in the case of the film-integrated gasket 11, the compression ratio in the thickness direction in mounting can be reduced as much as possible, and thus the film-integrated gasket 11 having a low reaction force characteristic can be provided.

In the above-described second embodiment, although the adjacent position 23, i.e., the position (bonding position) where the reinforcement body 25 containing the second resin film is stacked and bonded to the gasket support 31 containing the first resin film, is disposed over the entire four sides on the outer periphery of the gasket support position 22, the arrangement at the adjacent position 23 can be altered as appropriate.

Figure 6:
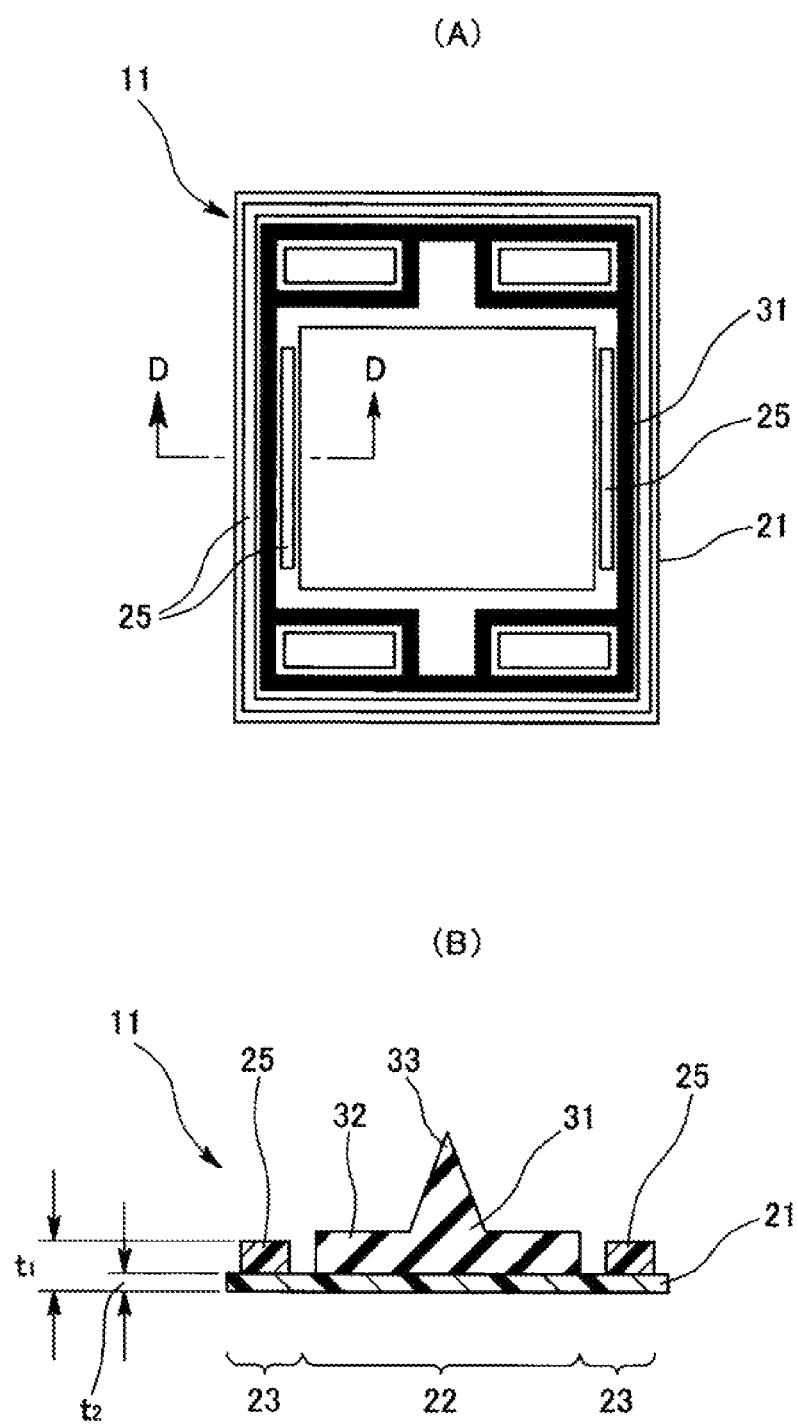

In FIGS. 6A-6B illustrated as a third embodiment, the adjacent position 23 or the bonding position is disposed over the entire four sides on the outer periphery of the gasket support position 22 and, in addition thereto, disposed on the inner periphery of the longitudinal sides of the inner periphery of the gasket support position 22.

In FIGS. 7A-7B illustrated as a fourth embodiment, the adjacent position 23 is set only to the outer periphery of the longitudinal sides of the outer periphery of the gasket support position 22.

The invention claimed is:

1. A film-integrated gasket comprising:
   a gasket body; and
   a gasket support body that is configured to support the gasket body, the gasket support body having a gasket support portion that supports the gasket body and a pair of adjacent portions located on opposing sides, respectively, of the gasket support portion,
   wherein the gasket support body consists of a resin film having a thin portion compressed in the thickness direction to set the thickness on one surface where the gasket support portion is to be smaller than the pair of adjacent portions, and having a flat surface on a surface opposite to the one surface, and
   the gasket support portion is defined by the thin portion provided on the one surface of the resin film, and the pair of adjacent portions are defined by portions on both sides of the thin portion on the one surface of the resin film.

2. The film-integrated gasket according to claim 1, wherein the resin film is formed of a material selected from the group consisting of polypropylene, polyethylene terephthalate, polyethylene naphthalate, polyimide, ester, amide, and imide.

3. The film-integrated gasket according to claim 1, wherein the gasket body includes a plate-shaped base having a sealing lip protruding therefrom, a thickness of the plate-shaped base being greater than a thickness of each of the adjacent portions located on opposing sides, respectively, of the gasket support portion.

4. A film-integrated gasket comprising:
   a gasket body; and
   a gasket support body that is configured to support the gasket body, the gasket support body having a gasket support portion that supports the gasket body and a pair of adjacent portions located on opposing sides, respectively, of the gasket support portion,
   wherein the gasket support body includes a first resin film having a constant thickness and a pair of second resin films formed on the first resin film with the gasket body located therebetween,
   the gasket support portion is defined by only the first resin film and the pair of adjacent portions are each defined by a combination of the first resin film and a respective second resin film such that the gasket support portion has a thickness that is less than a thickness of the pair of adjacent portions, and
   the second resin films and the gasket body are each formed on a same side of the first resin film.

5. The film-integrated gasket according to claim 4, wherein the first resin film is formed of a material selected from the group consisting of polypropylene, polyethylene terephthalate, polyethylene naphthalate, polyimide, ester, amide, and imide.

6. The film-integrated gasket according to claim 5, wherein the second resin films are each formed of a material selected from the group consisting of polypropylene, polyethylene terephthalate, polyethylene naphthalate, polyimide, ester, amide, and imide.

7. The film-integrated gasket according to claim 6, wherein the material of the second resin films is different from the material of the first resin film.

8. The film-integrated gasket according to claim 6, wherein the material of the second resin films is the same as the material of the first resin film.

9. The film-integrated gasket according to claim 4, wherein the gasket body includes a plate-shaped base having a sealing lip protruding therefrom, a thickness of the plate-shaped base being greater than a thickness of the second resin films.

* * * * *